(12) United States Patent
Kumfer et al.

(10) Patent No.: US 10,618,032 B2
(45) Date of Patent: Apr. 14, 2020

(54) LOW TEMPERATURE WET AIR OXIDATION

(71) Applicant: Siemens Energy, Inc., Orlando, FL (US)

(72) Inventors: Bryan J. Kumfer, Ringle, WI (US); Eric Martin, Tomahawk, WI (US); Simon Larson, Wausau, WI (US); Chad L. Felch, Kronenwetter, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 16/099,531

(22) PCT Filed: Apr. 28, 2017

(86) PCT No.: PCT/US2017/030024
§ 371 (c)(1),
(2) Date: Nov. 7, 2018

(87) PCT Pub. No.: WO2017/196557
PCT Pub. Date: Nov. 16, 2017

(65) Prior Publication Data
US 2019/0160452 A1    May 30, 2019

Related U.S. Application Data

(60) Provisional application No. 62/336,079, filed on May 13, 2016.

(51) Int. Cl.
| | | |
|---|---|---|
| *B01J 20/34* | (2006.01) | |
| *C02F 1/28* | (2006.01) | |
| *C02F 11/08* | (2006.01) | |
| *B01J 20/20* | (2006.01) | |
| *C02F 101/30* | (2006.01) | |
| *C02F 101/32* | (2006.01) | |
| *C02F 103/36* | (2006.01) | |
| *C02F 1/74* | (2006.01) | |

(52) U.S. Cl.
CPC .......... *B01J 20/3416* (2013.01); *B01J 20/20* (2013.01); *B01J 20/3475* (2013.01); *B01J 20/3483* (2013.01); *C02F 1/283* (2013.01); *C02F 11/08* (2013.01); *C02F 1/74* (2013.01); *C02F 2101/306* (2013.01); *C02F 2101/32* (2013.01); *C02F 2103/365* (2013.01); *C02F 2303/16* (2013.01); *C02F 2303/22* (2013.01)

(58) Field of Classification Search
CPC ........ B01J 20/34; B01J 20/3416; B01J 20/20; B01J 20/3475; C02F 1/283
USPC .......................................................... 502/23
See application file for complete search history.

(56) References Cited

U.S. PATENT DOCUMENTS

| | | |
|---|---|---|
| 8,501,011 B2 | 8/2013 | Felch |
| 2014/0061134 A1 | 3/2014 | Felch et al. |
| 2014/0116952 A1 | 5/2014 | Ellis |

FOREIGN PATENT DOCUMENTS

| | | |
|---|---|---|
| WO | 2016028987 A1 | 2/2016 |

OTHER PUBLICATIONS

PCT International Search Report and Written Opinion of International Searching Authority dated Jul. 7, 2017 corresponding to PCT International Application No. PCT/US2017/030024 filed Apr. 28, 2017.

*Primary Examiner* — Edward M Johnson

(57) ABSTRACT

There are disclosed systems and processes that substantially prevent scaling in the treatment of a spent carbon material in a wet air oxidation (WAO) system.

20 Claims, 2 Drawing Sheets

LOW TEMPERATURE WET AIR OXIDATION

CROSS-REFERENCE TO RELATED APPLICATIONS

This application is a National Stage application of PCT/US2017/030024, filed Apr. 28, 2017, which claimed priority to and the benefit of the filing date of U.S. Provisional Application No. 62/336,079, filed May 13, 2016, the entirety of which is hereby incorporated by reference.

FIELD

The present disclosure relates generally to chemical treatment systems and processes, and more particularly to systems and processes for reducing scaling due to scale forming contaminants in a wet air oxidation (WAO) system.

BACKGROUND

Wet air oxidation (WAO) is a well-known technology for treating process streams and is widely used, for example, to destroy pollutants in wastewater. The process involves aqueous phase oxidation of undesirable constituents by an oxidizing agent, generally molecular oxygen from an oxygen-containing gas, at elevated temperatures and pressures. In addition, the process can convert organic contaminants to carbon dioxide, water, and biodegradable short chain organic acids, such as acetic acid. Inorganic constituents including sulfides, mercaptides, and cyanides can also be oxidized. WAO may be used in a wide variety of applications to treat process streams for subsequent discharge, in-process recycle, or as a pre-treatment step for a conventional biological treatment plant.

Systems employing activated carbon, such as powdered activated carbon treatment (PACT) and granular activated carbon (GAC) systems, utilize different activated carbons to remove contaminants from various fluid streams. At some point, the ability of the activated carbon to remove further contaminants decreases. Wet air oxidation (WAO) systems have thus been employed to regenerate spent carbon. When biological solids are also present, the WAO system may also simultaneously oxidize the biological solids accompanying the spent carbon.

One common problem in known WAO systems is the build up of solids within components, such as fluid pathways, heat exchangers, and the like of the system. This "build up" is referred to as scaling. One such scale forming contaminant is calcium sulfate. To prevent the build up of calcium sulfate or like materials in the components of a WAO system, the scale forming contaminant must be periodically removed from the system. A number of techniques have been developed for removing scale forming contaminants to prevent disruption or loss of efficiency of the WAO system. These known solutions, however, have notable deficiencies. For example, one proposed solution utilizes a nitric acid wash through the relevant components. This process, however, is time consuming and can be dangerous as operators are required to handle concentrated and/or hot nitric acid. The acid wash process also requires a WAO system to be shut down, which typically results in a larger system being installed to account for the associated system downtime.

Further, WAO systems are currently built with "double pipe" heat exchangers to accommodate material heading to the reactor of the WAO system, as well as material from the reactor. Such heat exchangers allow the effluent from the WAO system, which is generally very hot, to provide heat to the material to be input into the WAO system. In such a case, when a scale forming contaminant, such as calcium sulfate, is present in the material to be input to the WAO system, the calcium sulfate may collect in undesired locations, such as on the tube side of the heat exchanger portion due to the inverse solubility of calcium sulfate. This scaling problem is very serious and may, in fact, lead to complete system shutdown.

BRIEF DESCRIPTION OF THE DRAWINGS

The invention is explained in the following description in view of the drawings that show.

DETAILED DESCRIPTION

Figure 1:
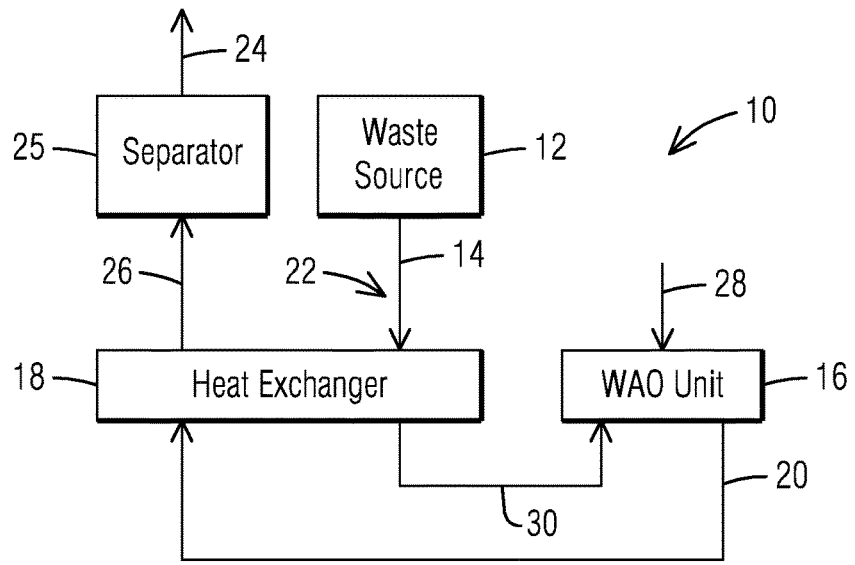
FIG. 1 is a schematic of a wet air oxidation (WAO) system in accordance with an aspect of the present invention.

The present inventors have developed systems and processes that substantially prevent scaling, particularly in the treatment of a waste material in a wet air oxidation (WAO) system. Aspects of the present disclosure are based upon the unexpected discovery that lowering the regeneration temperature will not have an adverse effect on carbon regeneration if the WAO residence time is extended and an elevated oxygen concentration is provided. As a result of the lower regeneration temperatures, the treated material (exiting a WAO reactor) utilized to heat an incoming feed to the WAO reactor may be at a temperature which is low enough to reduce or eliminate scaling (when the incoming feed includes a scale forming contaminant) while still providing desired heat to the incoming feed. This is particularly due to the fact that the scale forming contaminant may be increasingly insoluble in a medium as the temperature of the medium containing the scale forming contaminant increases. Thus, by controlling the temperature to promote the scale forming contaminant to remain in solution as the material having the contaminant travels to the WAO reactor, aspects of the present invention may substantially eliminate or reduce scaling problems.

In accordance with an aspect of the present invention, there is provided a treatment process comprising:

directing a feed stream comprising spent carbon and an amount of a scale forming contaminant therein through a heat exchanger and to a wet air oxidation unit for regeneration of the spent carbon therein;

adding an oxidant to the feed stream;

performing a wet air oxidation process on at least a portion of the feed stream in the wet air oxidation unit to produce a treated material comprising a regenerated carbon material and an offgas comprising a residual oxygen concentration of at least 10 vol. %; and directing the treated material from the wet air oxidation unit through the heat exchanger, wherein heat from the treated material is utilized to heat the feed stream in the heat exchanger;

wherein the wet air oxidation process is carried out at a temperature of about 200° C. or less with a residence time of at least about 3 hours.

As used herein, the term "about" refers to a value which may be ±5% of the stated value.

Now referring to the figures, for purposes of explanation, there is shown a WAO system 10 for regenerating a waste material, such as a spent carbon material with or without biological solids, in accordance with an aspect of the present invention. The WAO system 10 may include a waste source 12 for providing a waste feed 14, a reactor (e.g., a WAO unit 16 or WAO reactor 16), and a heat exchanger 18 for heating the waste feed 14 to be introduced into the WAO unit 16. In operation, a treated material 20 exits the WAO unit 16 and is delivered to the heat exchanger 18, e.g., a double pipe heat exchanger, where heat from the treated material 20 may be utilized to heat the incoming waste feed 14 on its way to the WAO unit 16.

In one aspect, the waste feed 14 delivered to the WAO unit 16 includes a component that causes scaling (hereinafter scale forming contaminant). Due to the high temperatures of the wet air oxidation process in the WAO unit 16, the treated material 20 exiting the WAO unit 16 in known processes is typically very hot due to the high temperatures of the WAO process, e.g., >240° C. At such temperatures, the waste feed 14 may thus be heated to a temperature which causes scale forming contaminants therein (when present) to precipitate, thereby resulting in significant undesired scaling of components in the WAO system 10, such as valves, flow paths, and within the heat exchanger 18. This is due to the fact that scale forming contaminant may be one with an inverse solubility—meaning one whose solubility in a medium actually decreases as a temperature of the medium increases at a given concentration of the contaminant. As mentioned previously, scaling is a serious issue and can even result in complete shutdown of the associated system.

The present inventors proposed to reduce the likelihood of scaling by reducing a temperature at which wet air oxidation is carried out. In so doing, the present inventors surprisingly found that equivalent regeneration can be accomplished at lower temperatures if the residence time of the material to be treated in the WAO reactor 16 is extended and an elevated oxygen concentration is provided. The lower temperature substantially prevents or eliminates the likelihood of scaling in the heat exchanger 18 and other components of the WAO system when the product of WAO regeneration is utilized to heat the incoming feed to the WAO system.

The waste source 12 may comprise any suitable system or apparatus which generates a feed stream (also called "waste feed" herein) 14 comprising at least one scale forming contaminant therein. By way of example, the scale-forming contaminant may comprise a member selected from the group consisting of aluminum, calcium, carbonate, iron, magnesium, phosphorus, sulfate, and combinations thereof. In a particular embodiment, the scale forming contaminant may be in the form of calcium sulfate. In any case, due to the presence of the scale forming contaminant, the waste feed 14 may be one that may potentially cause scaling of within the heat exchanger 18, valves, flow paths, and any other components in fluid communication with the WAO unit 16 if the temperature of the waste feed 14 is not properly controlled or is too high as it travels to the WAO unit 16.

In an embodiment, the waste source 12 may comprise a system configured to treat a fluid with a carbon material to remove target components therefrom and generate a "spent carbon" material. Thus, in an embodiment, the waste feed 14 may comprises a spent carbon material. By "spent," it is meant that an ability of the carbon material to remove further target components in a target material has at least decreased. Also, by "about," it is meant ±5% of the stated value. In addition to the spent carbon, the waste feed 14 comprises an amount of at least one scale forming contaminant therein as mentioned.

In a particular embodiment, the waste source 12 may comprise a powdered activated carbon treatment (PACT) system as is known in the art comprising an effective amount of powdered activated carbon material for capturing at least a portion of organic contaminants in a fluid introduced to the PACT system. Alternatively, the waste source 12 may further or instead comprise a granular activated carbon (GAC) treatment system. Accordingly, the waste feed 14 may comprise powdered activated carbon and/or granular activated carbon. Granular activated carbon typically has a larger particle size than powdered activated carbon. In certain embodiments, microorganisms may be added to the associated system to help break down the organic compounds adsorbed or otherwise loaded on the activated carbon. Thus, in certain embodiments, the waste feed 14 may also include biological material, as well as byproducts of the breakdown reactions. Exemplary activated carbon systems are described in U.S. Pat. No. 9,090,487 and US Published Patent Application No. 2014/0061134, the entirety of each of which is incorporated by reference herein.

When the waste source 12 comprises an activated carbon system which treats a fluid, the fluid to be treated may comprise any organic compound-containing stream, such as a wastewater stream from a refinery process. Exemplary materials to be removed or destroyed by the waste source 12 may include pesticides herbicides, phenols, phthalates, and hydrocarbons, e.g., aromatic hydrocarbons, aliphatic hydrocarbons and the like.

At some point after operation of the waste source 12 to remove components from a fluid using activated carbon, the ability of the carbon material to remove further target components may diminish or become exhausted ("spent" in either case). In this case, an amount of the waste feed 14, which may comprise spent carbon material, biological material (when present), scale forming contaminant(s), and any other components, may be delivered from the waste source 12 to the heat exchanger 18 to produce a heated waste feed 30. The heated waste feed 30 then travels on to the WAO unit 16. When the heated waste feed 30 comprises at least spent carbon and biological material, and the spent carbon is regenerated, organics and/or inorganics destroyed, and the biological material is oxidized in the WAO unit 16, the process may be referred to as wet air regeneration (WAR). Thus, in an embodiment, a WAR process is performed in the WAO unit 16.

In an embodiment, the waste feed 14, 30 may be in the form of a slurry or sludge having a water content ranging from about 90 wt % to about 97 wt % (solids content of about 3-10 wt %). In certain embodiments, the waste feed 14 may be conditioned in a gravity thickener (e.g., a sedimentation tank) to provide the waste feed 14, 30 in the form of a thickened sludge material.

As mentioned, the WAO system 10 may comprise one or more dedicated reactor vessels (e.g., WAO unit 16) in which oxidation and/or regeneration of the waste feed 30 may take place. In an embodiment, the incoming waste feed (14 or 30) may be mixed with an oxidant, e.g., a pressurized oxygen-containing gas which may be supplied by a compressor. The oxidant may be added to the waste feed prior to and/or after flow through the heat exchanger 18. As shown in FIG. 1, an oxidant 22 is introduced into the waste feed 14 prior to the heat exchanger 18, although it is understood that the present invention is not so limited. Within the WAO unit 16, the input material (heated waste feed 30) is heated for a suitable time and under suitable conditions effective to oxidize undesired components in the material and produce a treated material 20, such as a regenerated carbon product. In an embodiment, the treated material 20 includes a sludge (solid/liquid portion), which may include the regenerated carbon (when activated carbon is present), and a gaseous portion (offgas 24) having an oxygen content.

In accordance with an aspect of the present invention, the WAO process in the WAO unit 16 may be carried out at a temperature of about 200° C. or less, and in a particular embodiment from about 150° C. to about 200° C. The WAO process may also take place at any suitable pressure. In an embodiment, the pressure may be from about 10 to about 220 barg (about 150 to about 3200 psig), and in another embodiment from about 10 to 62 barg (150 to about 900 psig), and in a particular embodiment about 10 to about 35 barg (about 150-500 psig). In addition, the residence time is extended due to the lowered temperature in accordance with an aspect of the present invention. In an embodiment, the residence time is at least about 1 hour, and in a particular embodiment from about 3 to 8 hours, and in still further embodiments from about 4 to about 6 hours.

To accomplish the desired regeneration under the lower temperatures described herein, in an aspect, the regeneration is carried out under elevated oxygen conditions. As shown in FIG. 1, an oxidant stream 22 (from a suitable source) is introduced into the feed stream 14, 30 at a suitable flow rate upstream or downstream from the heat exchanger 18. In certain embodiments, the oxidant stream 22 may also be introduced directly into the WAO unit 16. Without limitation, the oxidant stream 22 may comprise at least about 20% by volume (vol. %) oxygen upon addition to the feed stream 14, 30.

By the outlet of the WAO unit 16 and following wet air oxidation, a gaseous portion, e.g., offgas 24, is produced having an oxygen content which is less than the oxygen content of the oxidant 22 stream. The offgas 24 includes a reduced oxygen content relative to the oxygen content in the oxidant stream 22 as result of oxygen being consumed in the WAO unit 16. In an embodiment, the treated portion 20 comprises the offgas 24. In certain embodiments, the offgas 24 may be separated from the treated portion by a suitable separator, e.g., separator 25, or alternatively via any suitable device or process.

In an embodiment, the offgas 24 comprises an oxygen concentration of at least about 3% by volume, and in certain embodiments from 5% by volume to about 15% by volume, and in further embodiments from about 10% by volume to about 12% by volume. It is contemplated that the oxygen content of the offgas 24 may be measured at any point downstream of the outlet of the WAO unit 16. In an embodiment, the oxygen content of the offgas 24 may be measured by a suitable oxygen measuring device/sensor following passing of the treated stream through a separator 25 as set forth below.

Upon completion of the WAO process, the treated material 20 exits the WAO unit 16. From the WAO unit 16, the treated material 20 may be utilized in the heat exchanger 18 to heat the waste feed 14 to be fed to the WAO unit 16 for treatment/regeneration. In an embodiment, the treated material 20 may comprise a regenerated material, such as a regenerated carbon material, as well as an oxygen-depleted gas mixture (the offgas 24) which includes a fraction the transformed contaminants. In this instance, the treated material 20 comprising offgas 24 may be fed through the heat exchanger 18 to heat the waste feed 14, and also produce a cooled treated material 26.

The cooled treated material 26 may be fed to storage, or directly used in further processing and treatment. When the cooled treated material 26 comprises regenerated carbon, it is appreciated that the regenerated carbon may be directly returned to the waste source 12, e.g., a PACT system, for carbon reuse.

In an embodiment, the cooled treated material 26 may be first directed to a separator 25 as shown in FIG. 1, which separates the offgas 24 from the solids/liquid portion of the cooled treated material 26. As noted above, the offgas 24 may have an oxygen concentration of at least about 3% by volume, in some embodiments from about 5% by volume to about 15% by volume, and in particular embodiments from about 10% by volume to about 12% by volume. In certain embodiments, the offgas 24 may be collected for further processing and/or transport.

To reiterate, if treated material 20 directly exiting the WAO unit 16 were to heat the waste material to be fed into the WAO unit 16 at too high a temperature, the heat from the treated material 20 would likely result in precipitation of scale forming contaminants in the waste feed 14, thereby resulting in significant undesired scaling within components of the system, including the heat exchanger(s), flow paths (piping, tubing, etc.), valves, and the like. The inventors have found that the desired objectives of WAO regeneration may still be achieved while producing a treated stream which minimizes or does not cause scaling when utilized for heat exchange via the processes and systems described herein. In addition to heat exchanger 18, it is contemplated that the reduced likelihood of scaling may take place at any location between the heat exchanger 18 and an internal cavity of the WAO unit 16 where oxidation and/or regeneration takes place.

In an embodiment, the processes described herein may be effective to reduce the temperature of the treated material 20 to a temperature that is less than a solubility temperature limit of a scale forming contaminant in the waste feed 14 at a given concentration of the scale forming contaminant. The solubility temperature limit may be considered to be a temperature at a particular concentration of the scale forming contaminant over which any increase in temperature will cause the scale forming contaminant to increasingly fall out of solution and plate (deposit) on a surface, such as a heat exchanging surface. As such, increasing the temperature of the medium containing the contaminant over the solubility temperature limit may significantly increase the amount of scale produced by that contaminant. However, below that solubility temperature limit, it is appreciated that little or no scale may be formed.

By way of example only, the scale forming contaminant in the waste feed may comprise calcium sulfate. Calcium sulfate has a solubility of about 100 mg/L at 130° C. Accordingly, at temperatures greater than 130° C., the solubility of calcium sulfate at that concentration may decrease in the medium in which it is solubilized. The present inventors have found that if the treated stream 20 has a temperature of about 200° C. or less, the likelihood of undesired scaling within the heat exchanger 18 and components downstream thereof may be substantially reduced or eliminated. In this way, the lower temperatures provided by the treated material 20 relative to prior art processes may substantially reduce or prevent the occurrence of undesired scaling in the system 10.

The heat exchanger 18 may comprise any suitable heat exchanger. In addition, the selection of a heat exchanger and any parameters (e.g., residence time, flow rates, volumes, pressures, etc.) may be modified as necessary to bring about the desired result. In an embodiment, the heat exchanger 18 may comprise a double pipe heat exchanger as is known in the art. A double pipe heat exchanger readily allows the waste feed 14 to be heated in the inner pipe of the heat exchanger 18, for example, while the outer pipe of the heat exchanger 18 allows the treated material 20 to be cooled as it heats the waste feed 14.

From an outlet of the heat exchanger 18, the heated waste feed 30 may then be fed to an inlet of the WAO unit 16 for oxidation of the material. In certain embodiments, since the heated waste feed 30 may not be as hot as in prior art materials entering the WAO unit 16, if necessary, the WAO unit 16 may further comprise one or more additional heat sources to introduce added heat 28 to the WAO unit 16 as necessary to carry out the WAO process—even at the lower temperatures described herein. In an embodiment, as shown in FIG. 1, the heat source may comprise a steam source which provides steam at a predetermined pressure to the WAO unit 16 for an auxiliary source of heat.

In the embodiments described herein, it is appreciated that one or more inlets, pathways, outlets, pumps, valves, coolers, energy sources, flow sensors, or controllers (comprising a microprocessor and a memory), or the like may be included in any of the systems described herein for facilitating the introduction, output, timing, volume, selection, and direction of flows of any of the components (e.g., regenerated carbon, spent carbon, steam, cooling fluids, therein) therein. A further exemplary WAO system and components thereof are set forth in U.S. Pat. No. 8,501,011, which is incorporated by reference herein.

The function and advantages of these and other embodiments of the present invention will be more fully understood from the following examples. These examples are intended to be illustrative in nature and are not considered to be limiting the scope of the invention.

EXAMPLES

Example 1

Figure 2:
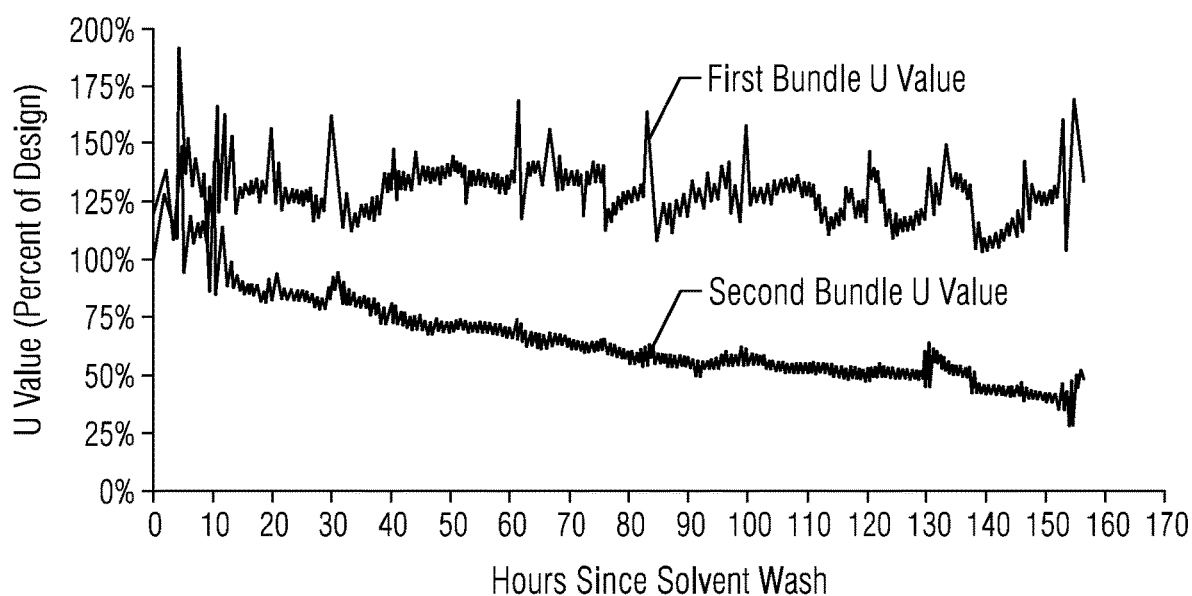
FIG. 2 is a graph illustrating a decline in heat exchange performance due to scaling effects (second bundle) and steady heat exchange performance (first bundle) by maintaining a low WAO temperature in accordance with an aspect of the present invention.

The present inventors have found that the overall heat transfer coefficient does not decrease unless the temperature of the material entering the heat exchanger (e.g., heat exchanger 18) is below the calcium sulfate solubility limit. As shown in FIG. 2, the top line therein illustrates the U-value of a heat exchanger which has its temperature controlled to about 180° C., corresponding to about 30 mg/L calcium. The lower line shows the U-value decrease on a higher temperature heat exchanger which exhibits calcium sulfate scaling.

To generate the results shown in FIG. 2, a flow scheme for a WAR unit that is operating at high temperature and high pressure was provided. The double pipe heat exchanger for this installation was very large and required to be split into two equal sections, in series. The flow path was as follows: cold feed material enters the first inner pipe bundle, then the material enters the inner pipe of the second bundle, then the material enters a steam trim heater where heat is added, then the material enters the WAR reactor, the WAR reactor effluent enters the outer pipe of the second bundle, and finally through the outer pipe of the first bundle. Temperature and pressure monitoring devices were placed throughout the double pipe heat exchanger bundle to track its performance. As shown in FIG. 2, the U-value (parameter used to track heat exchanger performance) for the first bundle (cold inner pipe fluid) held relatively constant. The U-valve for the second bundle, which is exposed to higher temperature within the inner tube, showed a rapid decline in performance, which soon shut the system down due to lack of heat recovery.

Example 2

The following example illustrates that equivalent regeneration of carbon was accomplished under reduced temperature conditions when at least residence time and residual oxygen concentration were increased. In this example, pressure was also decreased; however, it is appreciated that reduced pressure is not required for successful regeneration at the lower temperatures. That said, there may be a significant cost savings associated with operation at a reduced pressure, as well as reduced temperature. For example, operating at a reduced pressure may allow for direct injection of steam since most refineries have onsite steam with a pressure of at least 500 psig. In one aspect, reducing the temperature from 240 to 200° C. did not reduce regeneration effectiveness when residence time was increased from 1 to 4 hours: oxygen input to the WAO unit (resulting in a higher residual oxygen in the offgas) was increased; and pressure was reduced in the unit. See Table 1 below.

TABLE 1

| Carbon Regeneration Results | | | |
|---|---|---|---|
| | Units | 2 | 3 |
| Treatment Conditions | | | |
| Reactor Temperature | ° C. | 240 | 200 |
| Residence Time | Hour | 1 | 4 |
| Pressure | PSIG | 900 | 400 |
| Offgas Oxygen | % $O_2$ | 3-4 | 10-12 |
| Feed Results | | | |
| Soluble COD | mg/L | 298 | 217 |
| Suspended Solids | mg/L | 16,300 | 16,771 |
| Effluent Results | | | |
| Soluble COD | mg/L | 1850 | 1800 |
| MRE | % | 65% | 61% |

As shown in Table 1, the MRE (molasses relative efficiency), which is an indication of regeneration, are the same for the two conditions.

Figure 3:
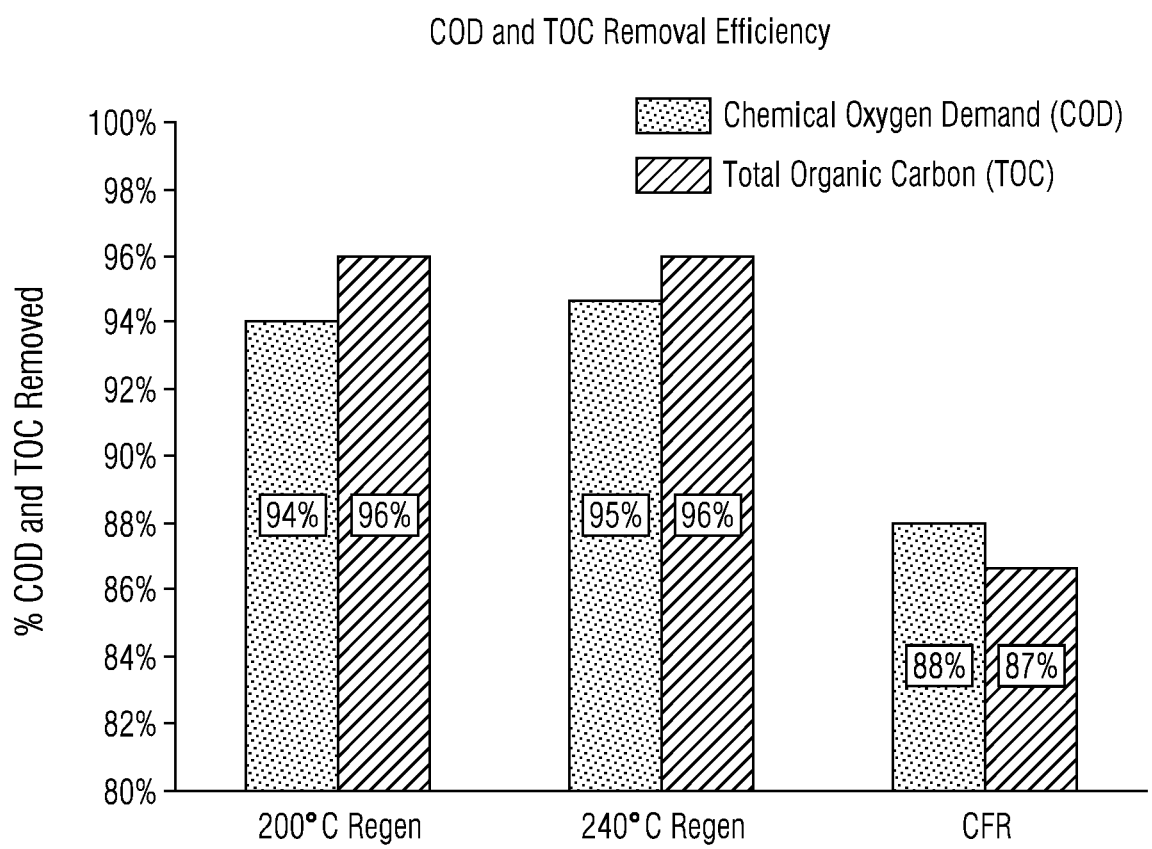
FIG. 3 is a graph showing equivalent performance of carbon regenerated at 240° C. and at 200° C. (with certain other parameter modifications) in accordance with an aspect of the present invention.

Further, long term SBR (sequencing batch reactor) testing was performed, which also showed that treatment performance with carbon regenerated at the two conditions was equivalent. The SBR simulates a full scale PACT treatment system in which carbon and wastewater are contacted. In addition, the SBR also contains biological material to assist in the treatment of the wastewater. During the long term SBR test, wastewater was mixed with biological material and activated carbon for a specific time to allow for treatment of the wastewater. After the specified time, a portion of the treated material was removed, the carbon along with the biological material was concentrated and regenerated using WAR. The regenerated carbon was then returned to the system with fresh wastewater to be treated. This testing confirmed regeneration of the carbon with multiple regeneration cycles through the side by side comparison of the SBR effluent performance under the two conditions. See FIG. 3 for illustration of the results. The left column at 200°, 240°, and CFR (left to right) shows COD (chemical oxygen demand) removed while the right column in each category shows TOC (total organic carbon) removed.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A treatment process comprising:
   directing a feed stream comprising spent carbon and an amount of a scale forming contaminant therein through a heat exchanger to control temperature of the feed stream to a temperature lower than a solubility temperature limit of the amount of the scale forming contaminant;
   adding an oxidant to the feed stream in an amount of at least about 20 vol. %;
   directing the feed stream to a wet air oxidation unit for regeneration of the spent carbon therein;
   performing a wet air oxidation process on at least a portion of the feed stream in the wet air oxidation unit for a residence time of at least about 1 hour, to produce a treated material comprising a regenerated carbon material and an offgas comprising a residual oxygen concentration of at least 3 vol. %; and
   directing the treated material from the wet air oxidation unit through the heat exchanger to control the temperature of the feed stream in the heat exchanger.

2. The process of claim 1, comprising performing the wet air oxidation process at a temperature of from about 150° C. to 200° C.

3. The process of claim 1, comprising performing the wet air oxidation process at a pressure of about from about 150-900 psig.

4. The process of claim 3, comprising performing the wet air oxidation process at a pressure of about from about 150-500 prig.

5. The process of claim 1, comprising performing the wet air oxidation process for a residence time of about 3 hours to about 8 hours.

6. The process of claim 1, wherein the wet air oxidation process produces an offgas with a residual oxygen concentration of about 5% to about 15% by volume.

7. The process of claim 6, wherein the wet air oxidation process produces an offgas with a residual oxygen concentration of about 10% by volume to about 12% by volume.

8. The process of claim 1, wherein the treated material comprises a temperature lower than the solubility temperature limit of the amount of the scale forming contaminant.

9. The process of claim 1, wherein the scale forming contaminant comprises at least one of aluminum, calcium, carbonate, iron, magnesium, phosphorus, sulfate, and combinations thereof.

10. The process of claim 9, wherein the scale forming contaminant comprises calcium.

11. The process of claim 10, wherein the scale forming contaminant comprises calcium sulfate.

12. The process of claim 1, wherein the heat exchanger comprises a double pipe heat exchanger.

13. The process of claim 1, wherein the feed stream is derived from at least one of a powdered activated carbon treatment (PACT) system or a granular activated carbon (GAC) system.

14. The process of claim 1, wherein the spent carbon comprises spent powdered activated carbon.

15. The process of claim 1, further comprising separating the offgas from the regenerated carbon material.

16. The process of claim 1, wherein the feed stream comprises an amount of biological solids.

17. The process of claim 1, comprising performing the wet air oxidation process at a temperature of about 200° C. or less.

18. The process of claim 13, further comprising returning the regenerated carbon material to the at least one of the PACT and the GAC system for carbon reuse.

19. The process of claim 1, further comprising directly transferring the treated material to a post-treatment process.

20. The process of claim 19, further comprising transferring the regenerated carbon material to a source of the feed stream for carbon reuse.

* * * * *